US006509936B1

(12) United States Patent

Brennesholtz

(10) Patent No.: US 6,509,936 B1

(45) Date of Patent: Jan. 21, 2003

(54) CATHODE RAY TUBE WITH MAGNETIC COIL FOR DISPLAY ENHANCEMENT

(75) Inventor: Matthew Scott Brennesholtz, Pleasantville, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 941 days.

(21) Appl. No.: 08/742,076

(22) Filed: Nov. 1, 1996

(51) Int. Cl.[7] .......................... H04N 5/21; H04N 9/16; G09G 1/04; H01F 7/00

(52) U.S. Cl. ....................... 348/626; 348/805; 315/399; 315/370; 313/440; 335/210; 335/213

(58) Field of Search ................................ 348/626, 805, 348/813; 315/370, 313, 399; 313/413, 440; 335/213, 210

(56) References Cited

U.S. PATENT DOCUMENTS

| | | | | | |
|---|---|---|---|---|---|
| 3,694,686 A | * | 9/1972 | Harao et al. | 313/75 |
| 4,455,542 A | * | 6/1984 | Sluijterman et al. | 335/213 |
| 4,980,613 A | * | 12/1990 | Miyama et al. | 315/366 |
| 5,093,728 A | | 3/1992 | Altmanshofer | 358/242 |
| 5,166,576 A | * | 11/1992 | Roussel et al. | 313/440 |
| 5,179,320 A | * | 1/1993 | Tripod | 315/399 |
| 5,223,769 A | * | 6/1993 | Priere et al. | 315/370 |
| 5,291,102 A | | 3/1994 | Washburn | 315/383 |
| 5,485,054 A | * | 1/1996 | Van Kemenade et al. | 313/440 |
| 5,489,948 A | * | 2/1996 | Vilard | 348/626 |
| 5,491,521 A | * | 2/1996 | Boie et al. | 348/626 |
| 5,621,287 A | * | 4/1997 | Dossot et al. | 348/626 |

FOREIGN PATENT DOCUMENTS

| | | |
|---|---|---|
| EP | 0592038 A1 | 4/1994 |
| JP | 63128530 | 6/1988 |

OTHER PUBLICATIONS

U.S. patent application Ser. No. 08/567,254, Brennesholtz, filed Dec. 5, 1995.

* cited by examiner

*Primary Examiner*—John Miller
*Assistant Examiner*—Paulos Natnael

(57) ABSTRACT

A method and projection television system for projecting images having a plurality of color components, includes a device for filtering a first color component signal from a composite signal to provide a filtered first color component signal. A defocusing mechanism defocuses the first color component signal based on the filtered first color component signal. A gain adjustment device adjusts a gain of at least one other of a plurality of color component signals of the composite signal. An amount of defocusing performed by the defocusing mechanism and a gain adjustment by the gain adjustment device are dependent on a content of the composite signal. In another aspect of the invention, a spot wobble scheme may be employed alone in a static defocussing system, without dependence upon the video signal content.

11 Claims, 3 Drawing Sheets

CATHODE RAY TUBE WITH MAGNETIC COIL FOR DISPLAY ENHANCEMENT

BACKGROUND OF THE INVENTION

This invention relates to cathode ray tubes (CRTS) for display systems, and more particularly relates to such CRTs having an auxiliary magnetic field-producing coil for modifying electron beam scanning to produce display enhancements.

Such coils for display enhancement are known. For example, U.S. Pat. No. 5,291,102, issued to Washburn, relates to such a coil for enhancing the dynamic color separation of a CRT display.

The use of such coils for modulating the scanning velocity of the electron beams is also known.

Such scan velocity modulation (SVM) has been shown to be a very effective and desirable way to increase the apparent resolution and "sparkle" of direct view and projection CRT systems. In operation, changes in electrical current through the SVM coil related to the display signal cause the scanning speed of the electron beams to decrease as the beams traverse boundaries between dark and light areas of the display. This increases the dwell time of the electron beams on the phosphor screen, which is perceived by a viewer as a sharpening of these boundaries, particularly boundaries in the vertical direction.

However, SVM is not universally employed for this purpose due in part to the relatively high cost of adding such a component to the CRT. A large part of this cost is due to the transducer, a small Helmholtz coil that is placed on the neck of the CRT.

The general principles as well as various specific designs of scan velocity modulation (SVM) circuits and transducer coils are known. See for example, U.S. Pat. Nos. 5,093,728 (SVM drive circuitry and system to prevent overheating); U.S. Pat. No. 5,179,320 (coil based on PCB flex circuit design wrapped around neck of CRT); U.S. Pat. No. 5,223,769 (conventional frame and wire coil mounted on neck of CRT); and see European Patent Application 0 592 038 A1 (coil supported by a synthetic resin sleeve mounted on the neck of the CRT).

The design in commercial use at the present time is the flexible coil based on PCB technology, wrapped around the neck of the CRT. This coil is expensive particularly because of the need to meet UL safety rules for smoke and flammability.

Furthermore, despite its flexibility, it is difficult to mount such a PCB coil in the ideal location just ahead of the exit apertures of the electron gun, since such a location corresponds to the steeply curved transition region between the neck and the funnel of the CRT envelope.

The English language abstract of Japanese Patent Application 63-128530 teaches printing each half of an SVM coil on the surface of one of the pair of glass beads which support the electrodes of the electron gun. While this design eliminates the flexible substrate in present use, and moves the coil closer to the electron beams, possibly reducing the power requirements for the coil, the design has several serious drawbacks.

First, the placement of the coils on the glass beads or multiforms, as they are also known, results in the magnetic field being created within the electron gun. This requires sufficient power to overcome the natural magnetic shielding effect of the metal gun parts, and risks disturbing the focusing performance of the gun, particularly the widely used "in-line" type of gun.

Second, the relatively long, narrow shape of the multiforms forces the SVM coil halves to also be long and narrow, further sacrificing the efficiency of coil performance.

Third, the outer surfaces of the multiforms are poorly controlled at the present time since they are not critical to the CRT design. Thus, there is considerable variation in surface characteristics such as surface smoothness, from tube to tube, unless additional costs are incurred in producing multiforms with uniform surface characteristics. Without such uniformity, it would be difficult to produce SVM coils with the required characteristics.

Fourth, in order to supply power to the coil, two extra pins would be required in the base of the tube, thus complicating and increasing the cost of manufacture of the tube.

Fifth, the placement of the coil inside the tube means that the tube manufacturer would have to provide the coil, thus preventing the system (eg., television set) manufacturer from purchasing a single, less expensive tube type, and adding the SVM coil only to those tubes destined for more expensive "high end" television sets, such as projection television sets.

Sixth, since the coil is formed inside the tube's vacuum sealed envelope, the materials and processing used to form the coil must be compatible with the demanding requirements of the tube design and processing; otherwise, the performance and/or life of the tube may be affected. A greater choice of materials and processes is thus available if the coil is placed outside of the tube envelope.

OBJECTS AND SUMMARY OF THE INVENTION

Accordingly, an object of this invention is to provide a CRT with a low cost magnetic field-producing coil such as an SVM coil, which avoids the above disadvantages.

In accordance with the invention, a CRT is provided in which such a coil is formed directly on the envelope of the CRT.

Such a coil is preferably formed in accordance with the invention on an outside surface of the tube's glass envelope, most preferably in the transition region between the neck and the funnel portions of the envelope.

Such a coil may be formed, for example, by any of several processes suitable for mass production, such as photolithography, silk screening, or printing.

Typically, such a coil is a Helmholtz coil with two halves, each half having from about three to seven turns and a current carrying capacity of about 450 milliamps. This resolution and current carrying capability are well within the capabilities of the these forming processes. For example, a coil formed from a 0.02 inch wide copper strip produced by photolithographic techniques such as are used in the fabrication of printed circuit boards (PCBs) can carry a 1 ampere current with essentially no temperature rise.

When such a scan velocity modulation (SVM) coil is formed directly on the surface of the envelope of a cathode ray tube (CRT) adjacent the exit end of the electron gun, it results in improved efficiency and reduced cost over conventional coils mounted on separate substrates or fixtures attached to the neck. In addition, a uniformity of coil characteristics is obtainable due to the uniformity of the envelope surface on which the coil is formed.

When the coil is formed on the outside surface of the tube envelope, a greater choice of materials and processes is available than if the coil is formed on the inside of the envelope. Moreover, such a coil can be provided by the system manufacturer on selective CRTs, leaving the CRT manufacturer free to produce a limited number of tube types, at higher volume and lower cost.

BRIEF DESCRIPTION OF THE DRAWINGS

The invention will now be described in terms of the preferred embodiments, with reference to the drawings, in which.

DESCRIPTION OF THE PREFERRED EMBODIMENTS

Figure 1:
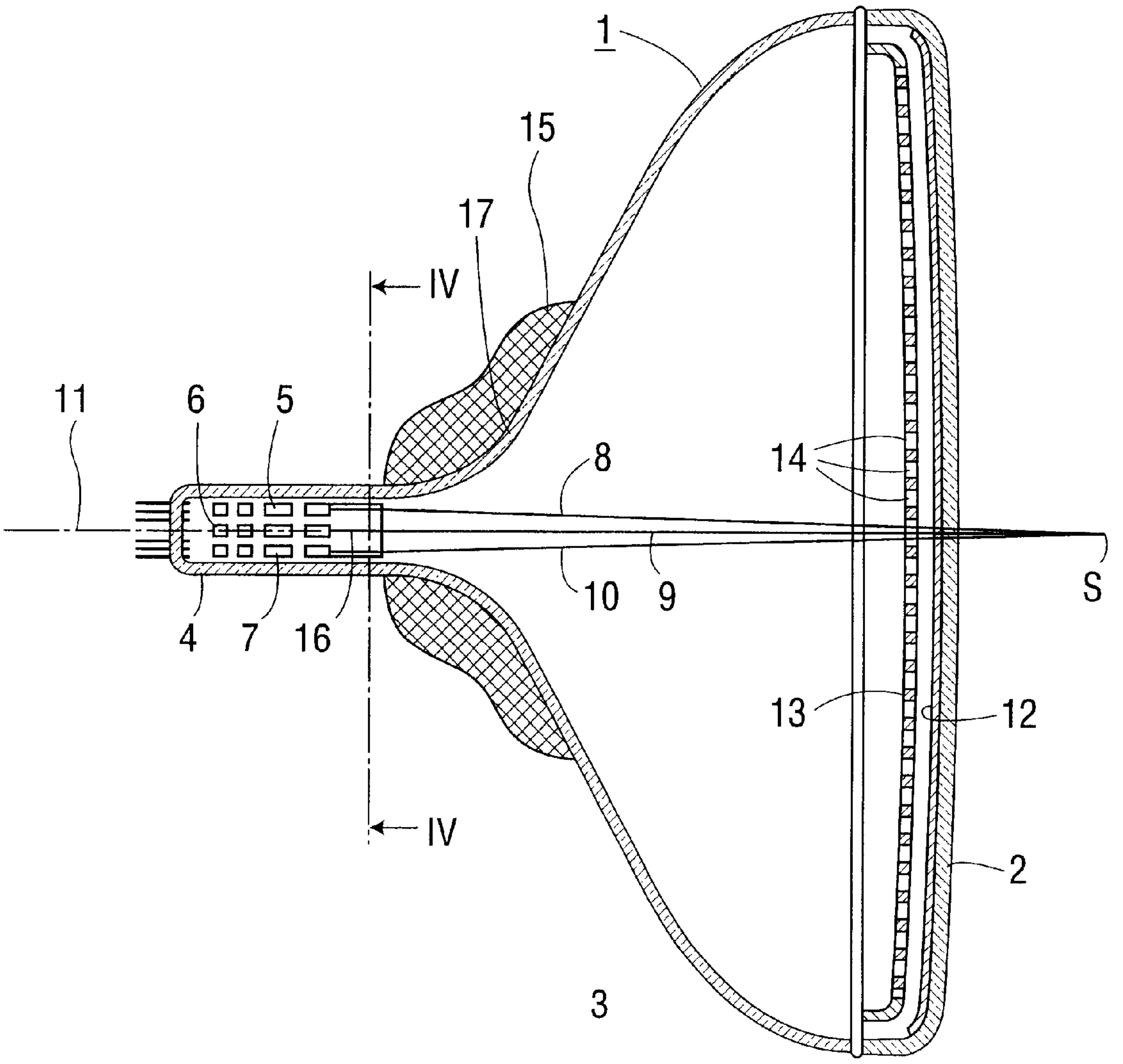
FIG. 1 is a diagrammatic sectional view of a known color cathode ray tube (CRT) of the "in line" type.

FIG. 1 is a diagrammatic sectional view of a known color cathode ray display tube of the "in-line" type. Three electron guns 5, 6 and 7, generating the electron beams 8, 9 and 10, respectively, are accommodated in the neck 4 of a glass envelope 1 which is composed of a display window 2, a funnel-shaped part 3 and a neck 4. The axes of the electron guns 5, 6 and 7 are situated in one "in-line" plane, in this orientation, the plane of the drawing. The axis of the central electron gun 6 coincides substantially with the tube axis 11. The three electron guns are seated in a sleeve 16 which is situated coaxially in the neck 4. The display window 2 has on the inner surface thereof a large number of triplets of phosphor lines. Each triplet comprises a line of a phosphor luminescing green, a line of a phosphor luminescing blue, and a line of a phosphor luminescing red. All of the triplets together constitute a display screen 12. The phosphor lines are normal to the plane of the drawing. A shadow mask 13, in which a very large number of elongate apertures 14 are provided through which the electron beams 8, 9 and 10 pass, is arranged in front of the display screen 12. The electron beams 8, 9 and 10 are deflected in the horizontal direction (in the plane of the drawing) and in the vertical direction (at right angles thereto) by a system 15 of deflection coils, surrounding the outside of the envelope in a transition region 17 between the funnel 3 and the neck 4. The three electron guns 5, 6 and 7 are assembled so that the axes thereof enclose a small angle with respect to each other. As a result of this, the generated electron beams 8, 9 and 10 pass through each of the apertures 14 at said angle, the so-called color selection angle, and each impinge only upon phosphor lines of one color.

Figure 2:
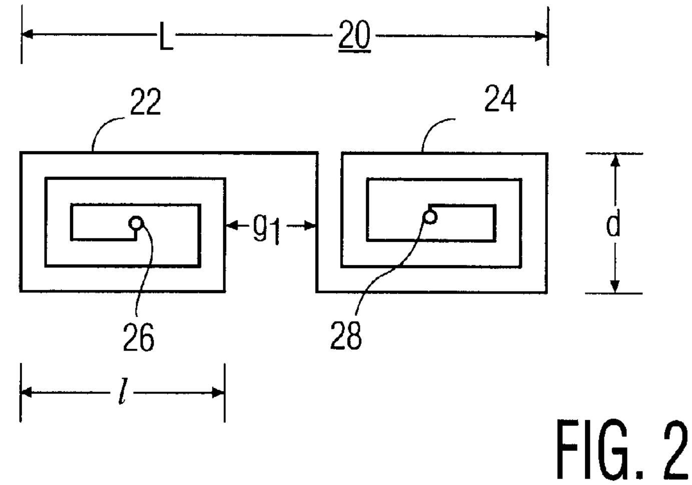
FIG. 2 is a plan view of a magnetic field-producing coil design suitable for use with the CRT of FIG. 1.

FIG. 2 is a plan view of a magnetic field-producing coil design suitable for use with the CRT of FIG. 1. The coil 20 consists of two connected halves 22 and 24, each having three turns, the outer turn having a length "l" and a width "d"; the last turn of each half terminates in a connecting pad 26, 28.

Figure 3:
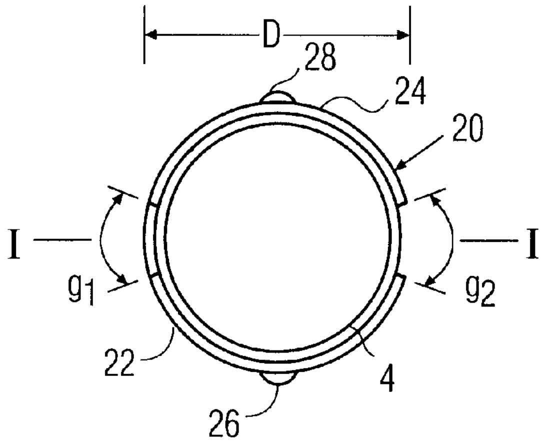
FIGS. 3 and 4 are cross sections along the line IV of FIG. 1 showing two different orientations of the coil design of FIG. 2 on the neck of the CRT envelope.
Figure 4:
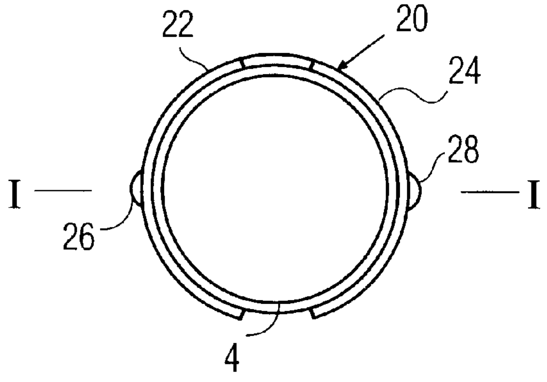
Figure 5:
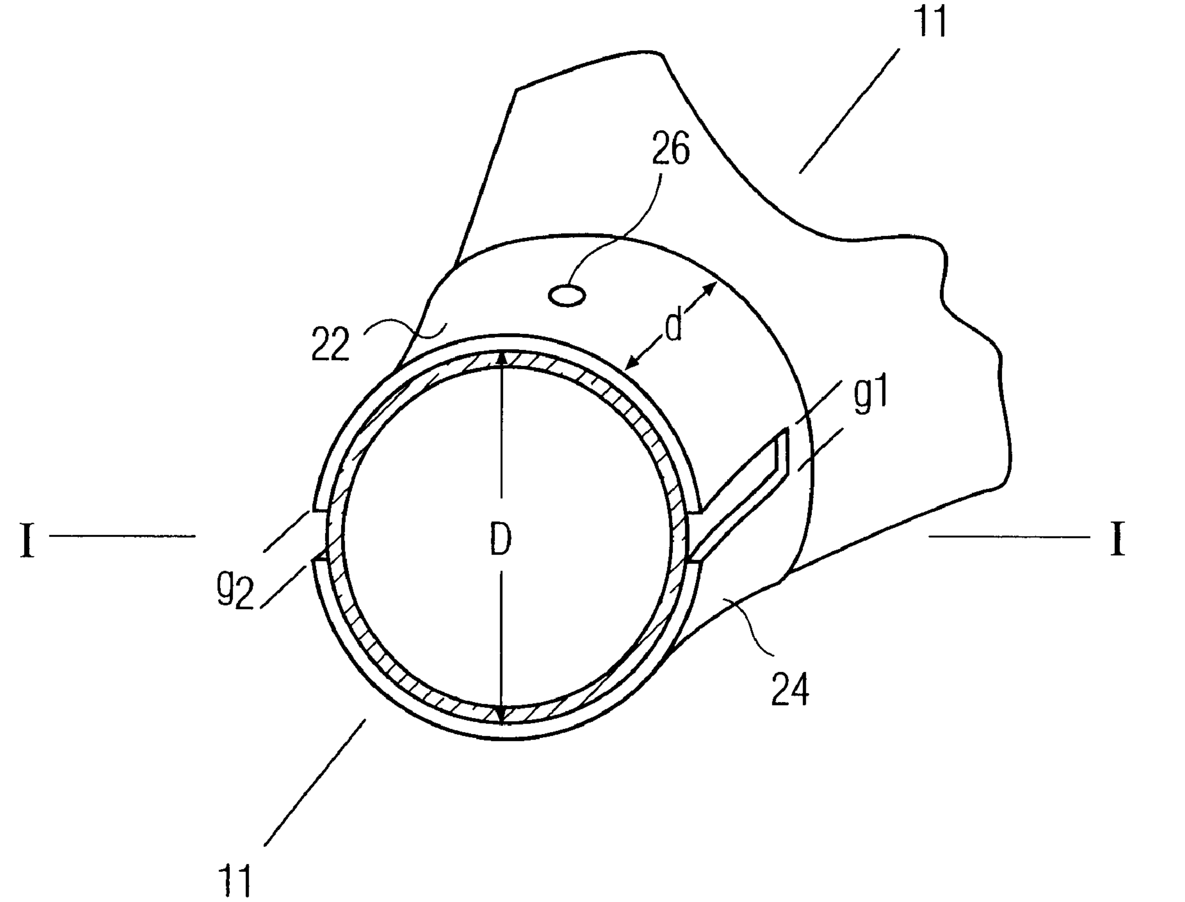
FIG. 5 is a perspective view of a portion of the envelope of the CRT of FIG. 1, sectioned along the line IV, showing a magnetic field-producing coil extending from the neck onto the transition region of the envelope.

The overall length "L" of the coil and the gap "g1" between the coil halves should be chosen so that when the coil 20 is formed on the neck 4, the gap g1 is approximately equal to the gap g2 between the distal ends of the coil, as shown in FIGS. 3 and 4, and the width "d" of the coil should be approximately in the range from D to 2D, where D is the outside diameter of the neck 4 of the CRT, as shown in FIG. 5, in order to promote the creation of a uniform magnetic field between the two coil halves at least in the vicinity of the electron beams.

FIGS. 3 and 4 show two different orientations of the coil of FIG. 2 on the neck 4. In the first orientation, shown in FIG. 3, the gaps g1 and g2 between the coil halves 22 and 24, situated in the in-line plane I. This is the preferred orientation for SVM operation to enhance display resolution, and to enhance the dynamic color separation of the display, as described in U.S. Pat. No. 5,291,102, issued to Washburn. In the second orientation, shown in FIG. 4, the gaps g1 and g2 are situated above and below the in-line plane I. This is the preferred orientation to achieve area-dependent dynamic blue defocusing, as described in U.S. Pat. No. 5,712,691 issued on Jan. 17, 2998, and assigned to the present assignee.

Referring now to FIG. 5, a perspective view of the neck and transition region of the CRT of FIG. 1, shows the overall shape and placement of the coil 20, with the gaps g1 and g2 between the two halves 22 and 24, situated in the in-line plane I; as may be seen, the coil 20 extends from the neck 4 onto the transition region 17, resulting in a complex torroidal shape, instead of the cylindrical shape which would result if the coil were confined entirely to the neck. Such a placement under the deflection coils 15, not shown in this figure, may result in a more efficient operation of the coil 20 on the electron beams than if the coil 20 were located over the electron gun; in addition, such a placement affords the opportunity to integrate an electrical connecting member into the mounting structure for the deflection coils 15, for making contact with the electrical contacts 26 and 28 of coil 20. Preferably the neck thickness is up to approximately 0.1 inch.

In the alternative, such an electrical connecting member could be integrated into the mounting structure of a static convergence assembly, not shown, which is also commonly mounted in the same vicinity on many types of CRTs.

The material used for the coils can be any electrically conductive material which is compatible with the chosen forming process and the electrical conductivity requirements of the coil.

In the case of silk screening, a silver, copper or carbon paste could be used. As is known, the paste is forced through the silk screen onto the neck glass, and then the paste is heated to remove the carriers, leaving the metallic conductive pattern.

A photoetching process similar to that used in the fabrication of printed circuit boards can also be used. In this case, a copper layer is formed in the area where the coil is to be formed, for example, by coating, spraying, vacuum deposition or plating. This copper layer is then covered with a photosensitive layer, such as a positive or negative photoresist. The photosensitive layer is then exposed through a positive or negative pattern to actinic radiation, resulting in hardening of the layer in areas corresponding to the desired coil pattern. The exposed layer is then "developed" by treating it with a solvent to selectively remove the unhardened portions, leaving exposed areas of the copper layer. These exposed areas are then removed by etching in a suitable acid or ferric chloride etchant to leave the desired coil pattern. Finally, the hardened photosensitive areas are removed.

Another suitable technique is so-called "stencil etching". In this technique, instead of forming a patterned mask on the copper layer using photolithographic techniques, the mask is formed by a printing process, eg, by silk screening a patterned enamel layer onto the copper layer, followed by etching the exposed portions of the copper layer to form the coil pattern, and then removing the enamel layer.

The coil could also be printed directly on the tube envelope by a modified ink-jet process using conductive inks. While this would be a cheaper process than the deposition and patterning processes described above, the lower conductivity and frequency response of some conductive inks may not be suitable for the most demanding applications, such as HDTV systems.

If desired, a scratch or scuff resistant coating (e.g. a resin coating) can be applied on top of the coil. Such a coating may be desirable to protect the coil from abrasion during the installation of the deflection yoke and/or the static convergence assembly onto the neck of the tube, in a known manner.

The invention has been described in terms of a limited number of embodiments. Other embodiments and variations of embodiments will become apparent to those skilled in the art, and are intended to be encompassed within the scope of the appended claims.

What is claimed is:

1. A cathode ray tube (CRT) comprising a vacuum sealed envelope, the envelope having a face portion, a funnel portion, a neck portion and a transition region between the funnel and neck portions, an electron gun situated in the neck portion, and a phosphor display screen on the inside of the face portion, characterized in that a magnetic field-producing coil is deposited or printed directly on a surface of the envelope of the CRT.

2. The cathode ray tube of claim 1 in which the coil is formed on the outside surface of the neck portion.

3. The cathode ray tube of claim 2 in which the coil comprises two halves.

4. The cathode ray tube of claim 2 in which the coil is a scan velocity modulation (SVM) coil.

5. The cathode ray tube of claim 4 in which the width of the coil is approximately equal to the outer diameter of the neck of the cathode ray tube.

6. The cathode ray tube of claim 1 in which the coil is formed by one of the techniques selected from the group consisting of photolithography, silk screening and printing.

7. The cathode ray tube of claim 3 in which each coil half comprises from about three to seven turns.

8. The cathode ray tube of claim 7 in which each turn terminates in an electrical contact portion.

9. The cathode ray tube of claim 2 in which the neck material is glass and the neck thickness is up to approximately 0.1 inch.

10. The cathode ray tube of claim 2 in which the coil material is selected from the group consisting of copper, silver, carbon, gold, indium, and their alloys.

11. The cathode ray tube of claim 1 where the magnetic field producing coil is disposed in the transition region between the funnel and neck portions.

* * * * *